United States Patent [19]
Sato et al.

[11] Patent Number: 5,349,531
[45] Date of Patent: Sep. 20, 1994

[54] NAVIGATION APPARATUS USING A GLOBAL POSITIONING SYSTEM

[75] Inventors: Kazuteru Sato; Kanshi Yamamoto; Mikio Morohoshi; Noriyuki Akaba; Atsushi Kawakami, all of Tokyo, Japan

[73] Assignee: Tokimec Inc., Tokyo, Japan

[21] Appl. No.: 848,388

[22] Filed: Mar. 9, 1992

[30] Foreign Application Priority Data

Mar. 13, 1991 [JP] Japan .................................. 3-048429
Mar. 13, 1991 [JP] Japan .................................. 3-048431

[51] Int. Cl.⁵ .......................... G01S 5/02; H04B 7/185
[52] U.S. Cl. ..................................... 364/449; 364/457; 342/357; 342/359
[58] Field of Search ............... 364/449, 443, 459, 457; 340/989, 990, 988; 342/46, 74, 99, 350, 357, 359

[56] References Cited

U.S. PATENT DOCUMENTS

| | | | |
|---|---|---|---|
| 4,754,280 | 6/1988 | Brown et al. | 342/357 |
| 4,894,655 | 1/1990 | Joguet et al. | 340/988 |
| 4,903,212 | 2/1990 | Yokouchi et al. | 364/449 |
| 4,918,609 | 4/1990 | Yamawaki | 364/449 |
| 4,949,268 | 8/1990 | Nishikawa et al. | 364/449 |
| 4,977,679 | 12/1990 | Saito et al. | 364/449 |
| 5,075,693 | 12/1991 | McMillan et al. | 364/449 |
| 5,101,356 | 3/1992 | Timothy et al. | 364/449 |
| 5,185,610 | 2/1993 | Ward et al. | 364/449 |

FOREIGN PATENT DOCUMENTS 03245075 10/1991 Japan .
3245076 10/1991 Japan .

OTHER PUBLICATIONS

Hiroshige et al., "Error Analysis of Electronic Roll Stabilization for Electronically Scanned Antennas", IEEE 1991 pp. 71–75.
Kowalski et al., "Music Algorithm Implementation for Shipboard HF Radio Direction Finding", IEEE, 1991, pp. 0943–0947.

Primary Examiner—Thomas G. Black
Assistant Examiner—Tan Q. Nguyen
Attorney, Agent, or Firm—Bauer & Schaffer

[57] ABSTRACT

A navigation apparatus utilizing a global positioning system having at least first and second satellite reception antennas installed on a navigation vehicle with a predetermined distance therebetween, a first azimuth computing unit for computing a first azimuth angle of the navigation vehicle from satellite radio waves received at the first and second antennas and a phase difference therebetween, a second azimuth computing unit for computing a second azimuth angle from a time change of antenna positions calculated from the satellite radio wave received at the first or second reception antenna, first and second multiplying units for multiplying outputs of the first and second azimuth computing units with predetermined coefficients respectively, an adding unit for adding outputs of the first and second multiplying units to produce a third azimuth angle, and a coefficient control unit for varying coefficient values of the first and second multiplying units in accordance with either the satellite arrangement or turning frequency of the navigation vehicle.

8 Claims, 4 Drawing Sheets

NAVIGATION APPARATUS USING A GLOBAL POSITIONING SYSTEM

BACKGROUND OF THE INVENTION

1. Field of the Invention

The present invention generally relates to navigation apparatus and, more particularly, is directed to a navigation apparatus which makes effective use of a global positioning system (GPS) to detect an azimuth angle, a position, a velocity and so on of navigation vehicles, such as ships, automobiles or the like.

2. Description of the Prior Art

As is conventional, a ship or the like is provided with a gyro compass and a magnetic compass as an apparatus for measuring its azimuth so that, under any conditions, she can sail safely while measuring its own azimuth constantly.

However, the gyro compass has the disadvantage such that it needs an actuation time as long as one hour or more. Also, the magnetic compass points to the north of terrestrial magnetism so that the ship's azimuth pointed by the magnetic compass is unavoidably deviated from the true north.

Recently, a global positioning system (hereinafter simply referred to as a GPS) navigation system is proposed to obviate the aforesaid disadvantages and shortcomings of the prior art and which can constantly detect the position of a navigation vehicle such as a ship or the like. The GPS system can measure the position of the navigation vehicle in a three-dimensional fashion on the basis of data supplied thereto from three GPS satellites or more. It is expected that this GPS system will be able to be employed by using a commercially available code, a so-called C/A code in the 1990s until which the launch of the GPS satellite is finished.

In the GPS signal processing based on the above ordinary measuring process, only the position of the navigation vehicle can be measured and a large error occurs in the position measuring process. As a consequence, the azimuth of the navigation vehicle cannot be measured according to the GPS. On the other hand, a method of calculating the azimuth angle of navigation vehicle is presented. According to this method, the azimuth angle of navigation vehicle is calculated by a two-position difference high accuracy simultaneous measuring method which measures a phase difference of GPS satellite radio waves used in the measuring called a differential GPS system.

A principle of this measuring method will be described below with reference to FIG. 1.

In FIG. 1, reference numerals 1 and 2 depict reception antennas installed on a navigation vehicle (not shown) such as a ship, an automobile, an airplane or the like, for example. A base line length, i.e., a distance L between the two antennas 1 and 2 is known. Radio waves from these antennas 1 and 2 are supplied to a GPS azimuth computing unit 3 which calculates an azimuth angle component $\phi$ of the navigation vehicle on the basis of the following processing.

As shown in FIG. 1, let it be assumed that a radio wave from a single GPS satellite 5 is simultaneously received by the antennas 1 and 2, At that time, due to the distance L between the antennas 1, 2 and the position of the GPS satellite 5, a distance difference shown by reference letter D in FIG. 1 is provided between the radio wave received at the antenna 1 and the radio wave received at the antenna 2. If a particular radio wave of a carrier is noticed, then this distance difference D can be measured as the phase difference (time lag). Accordingly, the distance difference D can be obtained by multiplying the phase difference with a wavelength of the radio wave. If the distance difference D is obtained, then the distance L is already known so that the azimuth angle $\phi$ of the navigation vehicle relative to the GPS satellite 5 can be calculated as:

$$\phi = \cos^{-1}(D/L) \tag{1}$$

In this measuring process, a reception code is not always decoded.

An azimuth angle formed by a line connecting the GPS satellite 5 and the antennas 1, 2 and the true north (N) is calculated as follows:

After the radio wave from the GPS satellite 5 is received at the antenna 1, radio waves from at least other two GPS satellites or more (not shown) are received. Then, the C/A codes of the received radio waves are decoded and a transmission time and a reception time of the radio wave from the GPS satellite are calculated to thereby obtain a propagation time of radio wave from the GPS satellite. Then, a distance from the antenna 1 to the GPS satellite, accordingly, the distance from the GPS satellite to the navigation vehicle is calculated by multiplying the calculated propagation time with a wavelength of the radio wave. Since the equidistant position from one GPS satellite exists on the spherical surface whose radius is equal to that distance, three spherical surfaces from the three GPS satellites are calculated and an intersection point of the three spherical surfaces is calculated, thereby the position of the reception antenna 1 being determined. If the position of the reception antenna 1 is obtained, then the position of the GPS satellite 5 is already known so that the azimuth angle $\theta$ can be calculated by a directional cosine of a position vector between the antenna 1 to the GPS satellite 5.

The element for executing the position calculating process from the received radio waves in order to obtain the position of the antenna 1 is the GPS position computing unit 4 which receives the radio wave from the antenna 1. Further, the element for performing the aforementioned calculation of $\phi$ and the calculation of $(\phi+\theta)$ on the basis of the position data from the GPS computing unit 4 and the data received from the antennas 1, 2 is the GPS azimuth computing unit 3.

As described above, the azimuth angle to the base line length L and accordingly, the azimuth angle of the navigation vehicle calculated at the GPS azimuth computing unit 3 is presented as $(\theta+\phi)$, which is then output as a digital signal therefrom.

However, in the conventional azimuth angle measuring apparatus which makes effective use of the GPS satellite, the measuring process of azimuth angle takes plenty of calculation time and consequently the azimuth angle cannot be measured continuously. As a consequence, when a ship, for example, turns, an error occurs in the azimuth angle measuring process because of a delay of time.

Further, the GPS radio wave has an area and a time in which a measuring error is increased from a GPS satellite location standpoint. In addition, due to a magnetic abnormality caused by the activity of sun, the measuring process becomes difficult.

As a method for obviating the aforesaid shortcomings, an azimuth angle measuring method is proposed, in which an angular velocity sensor (e.g., rate gyro) and an azimuth angle measuring apparatus employing the aforementioned GPS are combined. However, according to the azimuth angle measuring method in which the above-mentioned angular velocity sensor and the GPS azimuth angle measuring apparatus are combined, when an angular velocity detection axis (hereinafter referred to as an input axis) of the angular velocity sensor is inclined during the ship turns, there is then the disadvantage such that an error occurs in the azimuth angle detected by the angular velocity sensor.

Further, in the GPS azimuth angle computing apparatus, there is then the disadvantage such that a signal is suddenly fluctuated considerably by the influence of a multipath of radio wave and a propagation state of radio wave.

OBJECTS AND SUMMARY OF THE INVENTION

Therefore, it is an object of the present invention to provide an improved navigation apparatus utilizing a GPS in which the aforesaid shortcomings and disadvantages encountered with the prior art can be eliminated.

More specifically, it is an object of the present invention to provide a navigation apparatus using a GPS in which an azimuth angle of navigation vehicle such as a ship or the like can be continuously obtained with high accuracy.

It is still another object of the present invention to provide a navigation apparatus with the GPS apparatus which can measure an azimuth angle of a navigation vehicle without a delay of time.

It is a further object of the present invention to provide a navigation apparatus with the GPS which can obtain an azimuth angle of a navigation vehicle continuously with high accuracy even when an error of an azimuth angle obtained from a GPS satellite is increased.

It is a still further object of the present invention to provide a navigation apparatus with the GPS in which, when a vibratory gyro is employed, the vibratory gyro is long in life, low in power consumption and short in actuation time.

It is a yet further object of the present invention to provide a navigation apparatus with the GPS which can measure not only the azimuth angle but also position and speed of a navigation vehicle precisely.

It is a yet further object of the present invention to provide a navigation apparatus with the GPS apparatus which can cope with a fluctuation of an azimuth angle signal from a GPS azimuth computing unit.

As an aspect of the present invention, a navigation apparatus utilizing a global positioning system is comprised of at least first and second satellite reception antennas installed on a navigation vehicle with a predetermined distance therebetween, a first azimuth computing unit for computing an azimuth angle of the navigation vehicle from satellite radio waves received at the first and second antennas and a phase difference therebetween, a second azimuth computing unit for computing an azimuth angle from a time change of antenna positions calculated from the satellite radio wave received at the first or second reception antenna, first and second multiplying units for multiplying outputs of the first and second azimuth computing units with predetermined coefficients respectively, an adding unit for adding outputs of the first and second multiplying units to produce an azimuth angle, and a coefficient control unit for varying coefficient values of the first and second multiplying units in accordance with situations.

The above and other objects, features, and advantages of the present invention will become apparent from the following detailed description of illustrative embodiments thereof when read in conjunction with the accompanying drawings, in which like reference numerals are used to identify the same or similar parts in the several views.

DETAILED DESCRIPTION OF THE PREFERRED EMBODIMENTS

A first embodiment of a navigation apparatus using a GPS according to the present invention will hereinafter be described with reference to FIGS. 2 and 3.

Figure 2:
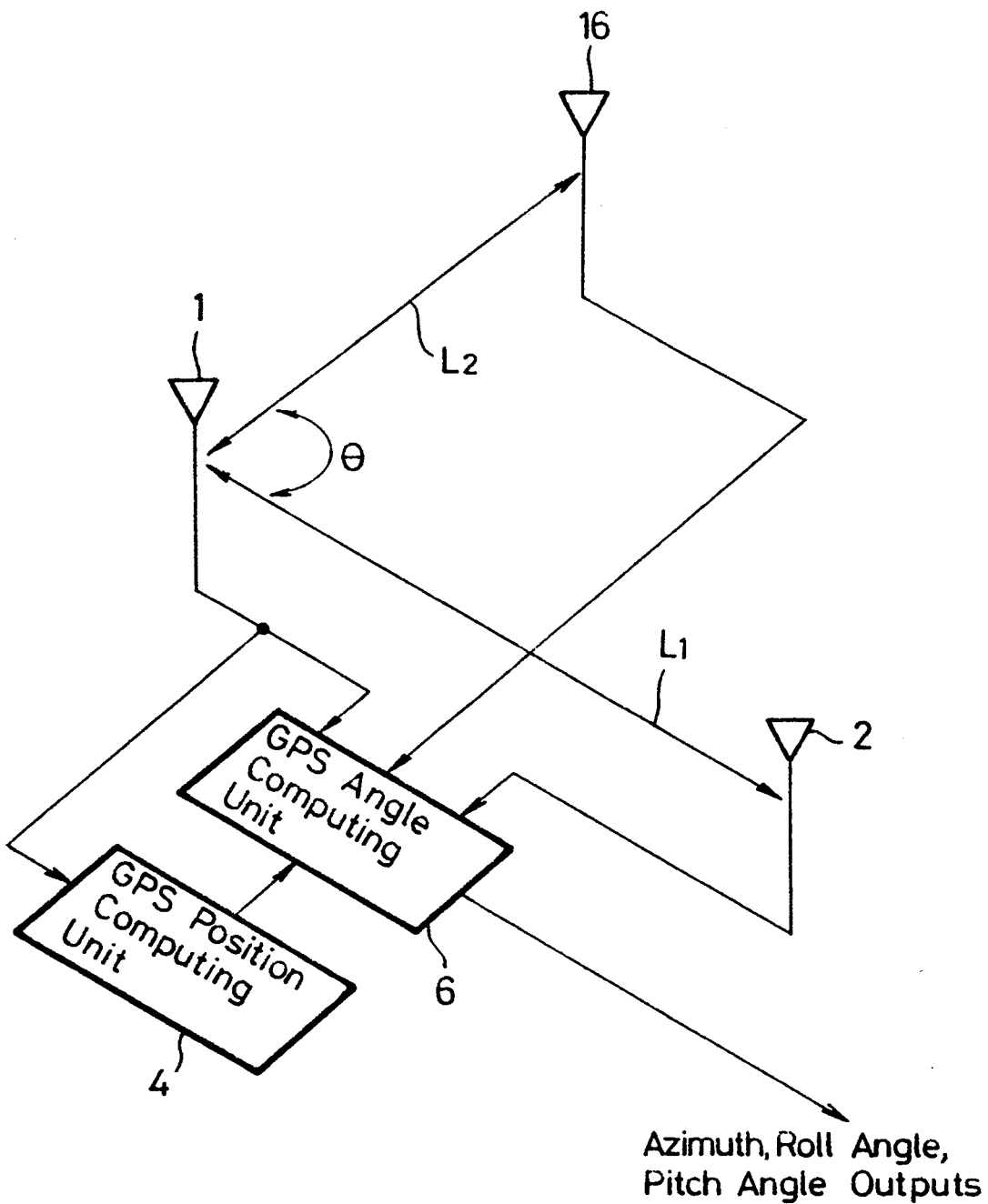
FIG. 2 is a schematic diagram used to explain a principle of measuring an azimuth angle, a roll angle and a pitch angle on the basis of a global positioning system (GPS)
Figure 3:
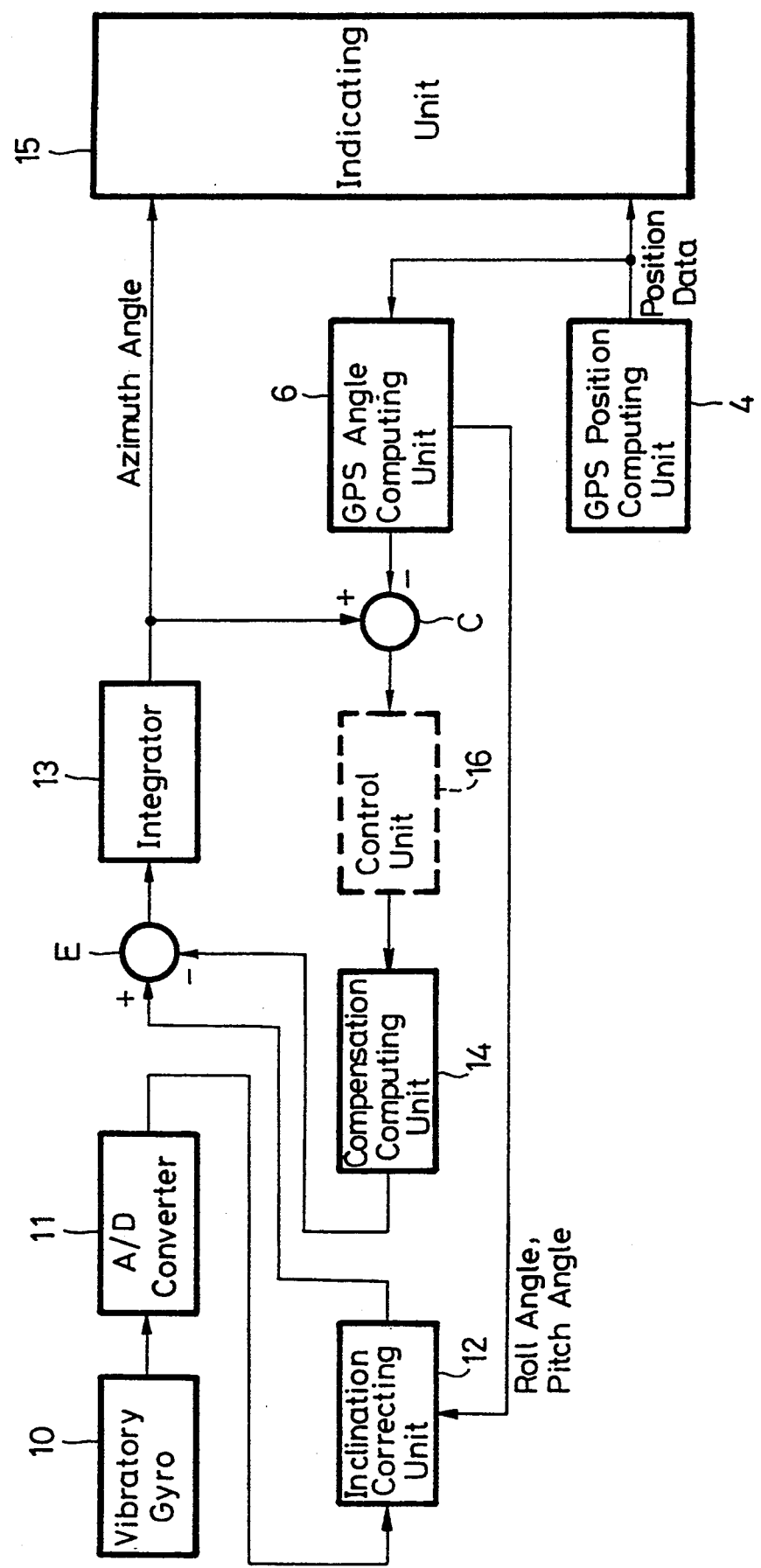
FIG. 3 is a block diagram showing a first embodiment of a navigation apparatus using a GPS according to the present invention.

FIG. 2 is a schematic diagram used to explain a principle of measuring an azimuth angle, a roll angle and a pitch angle of a navigation vehicle on the basis of a global positioning system (GPS) according to the present invention and FIG. 3 is a block diagram showing an embodiment of the present invention which employs an angle measured value provided by the GPS.

Figure 1:
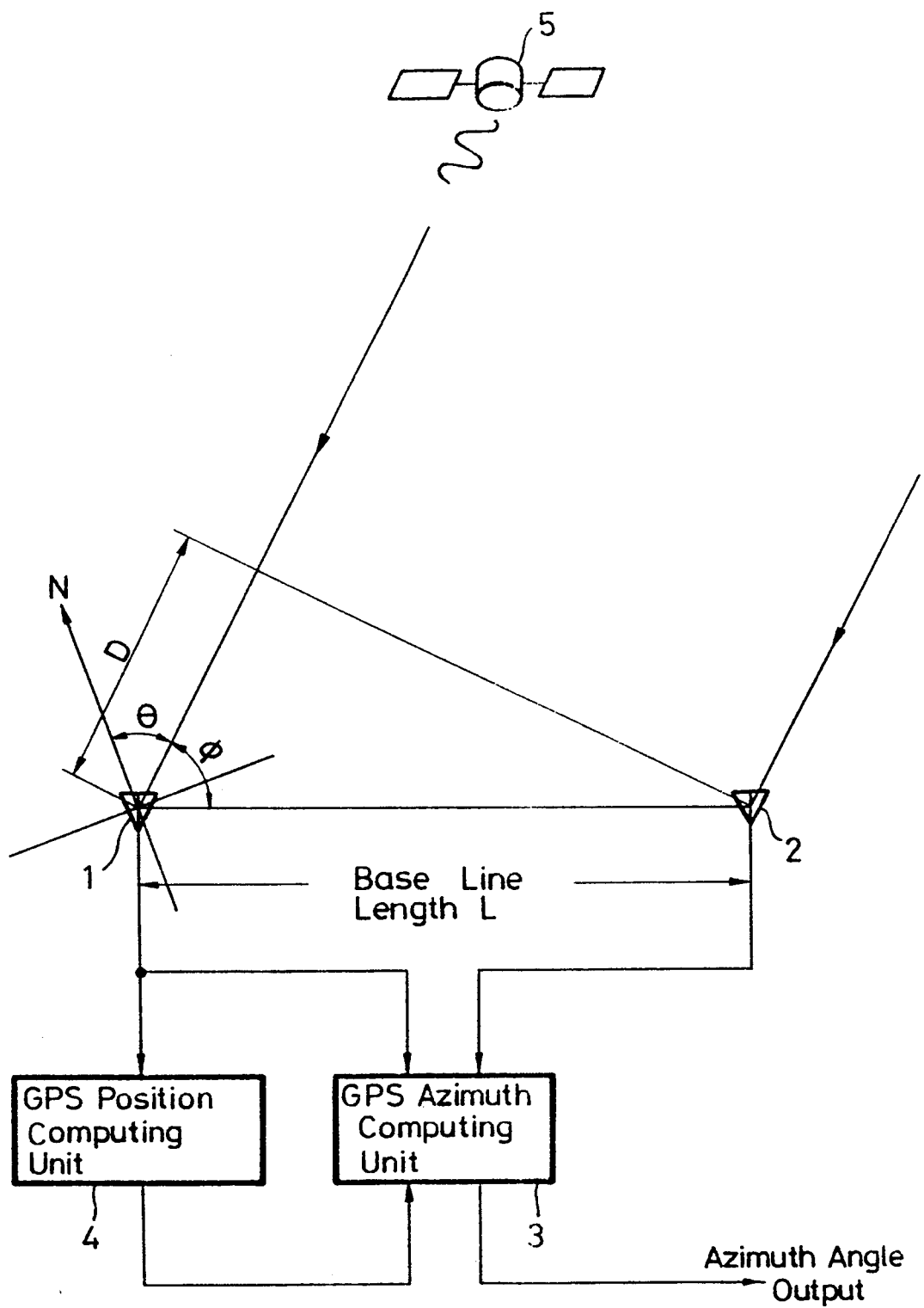
FIG. 1 is a schematic diagram used to explain a principle of measuring an azimuth angle of a navigation vehicle according to the prior art.

In FIGS. 2 and 3, like parts corresponding to those of FIG. 1 are marked with the same references and therefore need not be described in detail.

FIG. 2 shows an arrangement in which other angles measured by the GPS shown in FIG. 1 than the azimuth angle, e.g., a roll angle and a pitch angle of a navigation vehicle can be measured. As shown in FIG. 2, the reception antenna 1 is installed on a navigation vehicle (e.g., ship) in order to receive a radio wave from the GPS satellite (not shown). Then, with reference to the reception antenna 1 thus installed, the reception antenna 2 is installed at a point distant from the reception antenna 1 by a certain base line length $L_1$ and a reception antenna 16 is installed at a point distant from the reception antenna 1 by a certain base line length $L_2$ on the same plane at an already-known angle $\Theta$ therebetween.

These specific numerical values might be such that $L_1 = L_2 = 1$ m and that $\Theta = 90$ degrees. In this case, the $L_1$ direction is assumed to be a ship's heading direction. Outputs of the reception antennas 1, 2 and 16 thus installed are input to the GPS angle computing unit 6 which measures and then calculates an azimuth angle, a roll angle and a pitch angle of a navigation vehicle in a three-dimensional manner by using the output of the GPS position computing unit 4 on the basis of the principle described in connection with FIG. 1.

The system shown in FIG. 3 is constructed by using the azimuth angle output, the roll angle output and the pitch angle output measured by the arrangement shown in FIG. 2.

In FIG. 3, reference numeral 10 designates an angular velocity sensor such as a rate gyro secured to a navigation vehicle's body, i.e., ship's body in such a fashion that a yawing axis of the ship's body is assumed to be its input axis. The vibration or vibratory gyro 10 is the rate gyro without a rotating member such that on the basis of a dynamics principle in which a Coriolis force acts on the direction perpendicular to both of a vibration vector and an angular velocity vector when an angular velocity acts on the vibrating object in the direction perpendicular to its vibration vector, it detects the magnitude and direction of the angular velocity from Coriolis force and outputs an angular velocity in the form of an analog voltage. Incidentally, when the vibratory gyro 10 is employed as the angular velocity sensor, this vibratory gyro 10 is not provided with the rotating member and is therefore long in life, short in actuation time and low in power consumption or the like.

As shown in FIG. 3, an output angular velocity of the vibratory gyro 10 is supplied to an analog-to-digital (A/D) converter 11, in which it is converted into a digital signal. Then, this digital signal is corrected in inclination of the gyro input axis by an inclination correcting unit 12, which will be described later. The digital signal thus corrected by the inclination correcting unit 12 is supplied through an adder E to an integrator 13. The integrator 13 has a function to integrate an angular velocity and hence the output thereof represents an angle. An output angle of the integrator 13 is set such that the the input axis of the vibratory gyro 10 becomes the vertical axis. Thus, the output angle of the integrator 13 can be regarded as an azimuth angle of the navigation vehicle.

On the other hand, the azimuth angle output calculated by the GPS angle computing unit 6 shown in FIG. 2 is compared with the azimuth angle, which results from integrating the output of the vibratory gyro 10, by a comparator C, and a residual angle therebetween is input to a compensation computing unit 14. The compensation computing unit 14 is formed of a (proportional gain K+integration) and acts to multiply the residual angle by K. An output multiplied by K from the compensation computing unit 14 is fed back to the adder E at the input stage of the integrator 13 in the form of an opposite code.

If the system is constructed as described above, then the azimuth angle, which results from integrating the output angular velocity of the vibratory gyro 10, can follow the azimuth angle from the GPS angle computing unit 6. Accordingly, even if the output cycle of the GPS angle computing unit 6 is extended, then such azimuth angle is compensated for by the azimuth angle of the vibratory gyro 10 so that a continuous and accurate azimuth angle can be output constantly.

The roll angle output and the pitch angle output from the GPS angle computing unit 6 are supplied to the inclination correcting unit 12 and are used to correct the output angular velocity error of the vibratory gyro 10 due to the change of the attitude angle of the navigation vehicle, thus making it possible to detect the motion of the navigation vehicle on the horizontal plane correctly.

Considering this function in the case such that the navigation vehicle turns during the rolling of an angle $\alpha$, a turning angular velocity $\omega$ detected by the gyro exists on the plane inclined by the angle $\alpha$, whereby an angular velocity within the horizontal plane is represented as $\omega/\cos \alpha$. Then, the azimuth angle, which results from integrating the angular velocity, is the angle within the horizontal plane so that, when the output $\omega$ of the gyro secured to the ship's body is employed, then an error of $1-1/\cos \alpha$ occurs between it and a true value.

This is also true in the case such that the navigation object turns during the pitching, and as a result, an error occurs due to the pitching angle.

The inclination correcting unit 12 is an element which uses the signal from the GPS to correct the error due to the attitude angle of the navigation vehicle on the basis of the above-mentioned principle. According to this inclination correcting unit 12, it becomes possible to measure the azimuth of the navigation vehicle with high accuracy.

An indicating unit 15 in FIG. 3 is an element which indicates thereon the azimuth angle from the integrator 13 and the position output data from the GPS position computing unit 4.

In FIG. 3, a phantom block 16 represents a control unit which inhibits the output of the comparator C from being supplied to the compensation computing unit 14 when the output value of the comparator C exceeds a certain reference value (e.g., 5°). For example, the control unit 16 might be formed of a comparator which is supplied at one input terminal thereof with the above constant value and at the other input terminal thereof with the output of the comparator C. When the output of the unit 14 is larger than the above constant reference value, the control unit 16 does not derive the output.

As set out above, according to the first embodiment of the present invention, the following effects can be achieved.

(1) The azimuth angle of navigation vehicle such as a ship or the like can be continuously obtained with high accuracy;
(2) The azimuth angle can be measured without a delay of time;
(3) Even when an error of an azimuth angle obtained from the GPS satellite is increased, then the azimuth angle can be continuously obtained with high accuracy;
(4) Since the vibratory gyro is long in life, low in power consumption and short in actuation time when in use, the navigation apparatus has the same advantages; and
(5) Not only the azimuth angle but also the position and the speed can be measured precisely.

A second embodiment of the navigation apparatus employing the GPS according to the present invention will be described below with reference to FIG. 4.

Figure 4:
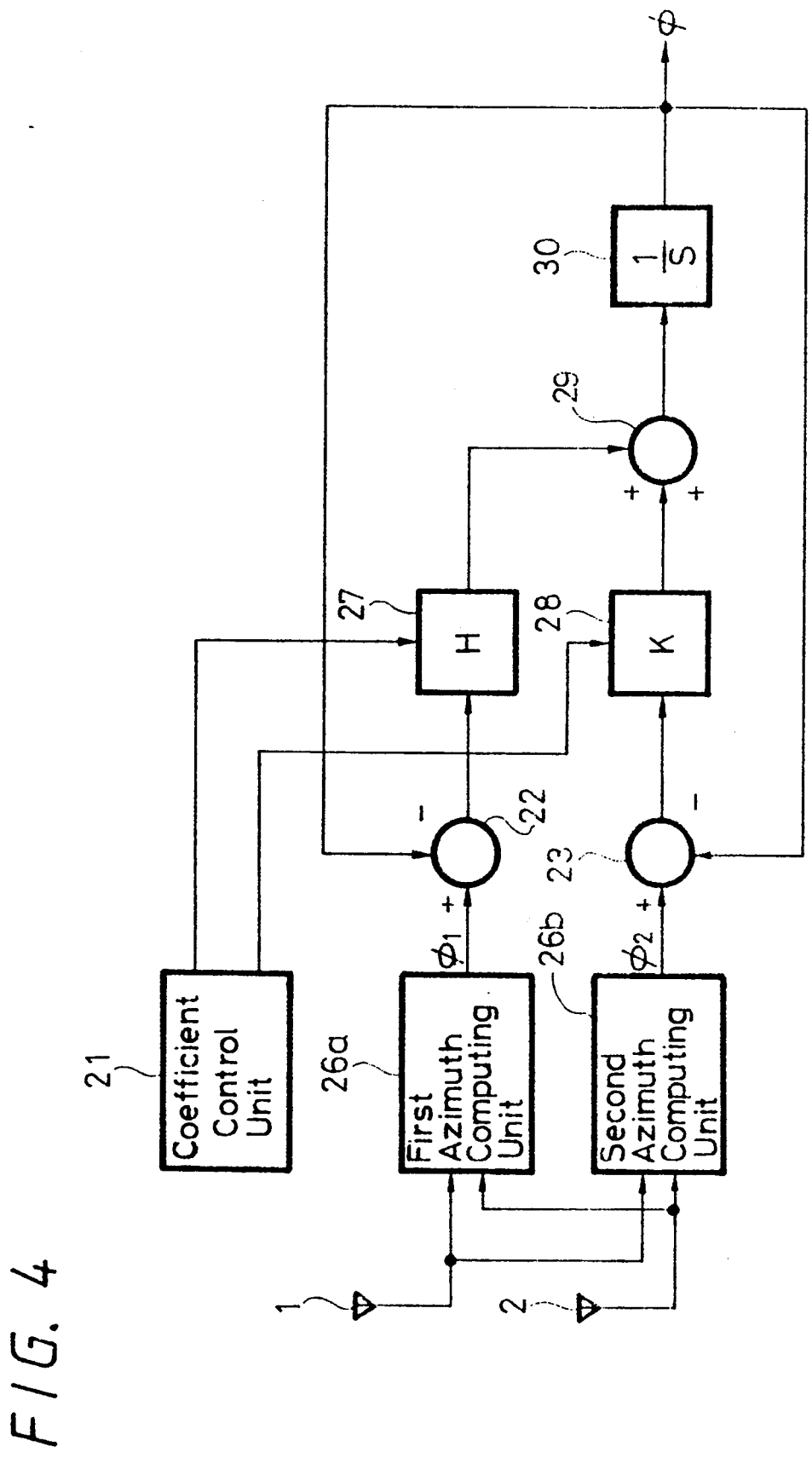
FIG. 4 is a block diagram showing a second embodiment of the navigation apparatus employing a GPS according to the present invention.

As shown in FIG. 4, signals received at the reception antennas 1 and 2 installed on the navigation vehicle at the predetermined distance therebetween shown in FIG. 1 are respectively supplied to first and second azimuth computing units 26a and 26b which calculate azimuth angles $\phi_1$ and $\phi_2$, respectively.

The first azimuth computing unit 26a is similar to the GPS azimuth computing unit 3 in the example of the prior art and is adapted to calculate the azimuth angle $\phi_1$ from a phase difference of the radio waves received at the reception antennas 1, 2, the positions of the reception antennas 1, 2 and the distance between the antennas 1 and 2. The resultant azimuth angle $\phi_1$ is multiplied with H by a multiplier 27 and then fed to an adder 29.

On the other hand, the second azimuth computing unit 26b calculates the azimuth angle $\phi_2$ from the change of the position of the reception antenna 1 or 2 per time. Alternatively, the azimuth angle $\phi_2$ may be calculated from the velocity signal vector of the GPS received at the antenna 2.

When the navigation vehicle moves, it receives the GPS wave and, by Doppler effect caused by the movement of the navigation vehicle, the frequency of the GPS wave is changed. This frequency change can be detected by a phase-locked loop provided in the GPS receiver.

If the frequency of GPS wave and the amount of frequency change caused by the movement of the satellite are subtracted from the above detected frequency change, the frequency change amount by the movement of navigation vehicle can be derived. Since the position of satellite and the position of navigation vehicle are known, if the frequency change amounts of a plurality of satellites are measured, the east-west and south-north velocity vectors of navigation vehicle can be calculated. The direction of composite vector of the above two velocity vectors represents the motion direction of navigation vehicle so that the azimuth angle of navigation vehicle can be calculated from the velocity vector. Then, the resultant azimuth angle $\phi_2$ is multiplied with K by a multiplier 28 and then fed to the adder 29.

The adder 29 adds the outputs of the multipliers 27 and 28 and supplies the added output to an integrator 30.

Further, an output of the integrator 30 is outputted as the azimuth angle $\phi$ and is negatively fed back to subtractors 22 and 23 which are respectively provided at the input sides of the multipliers 27 and 28, thereby a primary delay system being constructed. According to this primary delay system, a filtering effect can be achieved.

The azimuth angle from the integrator 30 reflects the weightings of the azimuth angles $\phi_1$ and $\phi_2$ determined by the coefficients H and K.

A coefficient control unit 21 is adapted to change the coefficients H and K of the multipliers 27 and 28 in accordance with the situation.

For example, under the situation such that the multipath of radio wave tends to occur, the first azimuth computing unit 26a is rather influenced thereby considerably as compared with the second azimuth computing unit 26b and consequently, the sudden fluctuation of the output value $\phi_1$ occurs frequently. In this case, by making the coefficient K larger than the coefficient H, the weighting of the output value $\phi_1$ is reduced and the navigation apparatus can cope with such influence exerted by the multipath of radio wave.

On the other hand, if the change of refractive index in the air occurs, then a propagation path of radio wave is changed so that much errors tend to occur in the output value $\phi_2$ of the second azimuth computing unit 26b. In this case, by making the coefficient H larger than the coefficient K, the weighting of the output value $\phi_2$ is reduced and the navigation apparatus can cope with such influence exerted by the change of the propagation path.

In the control of the coefficients H and K, the coefficients H and K can be controlled to fall in proper values on the basis of a function of geometric dilution of precision (GDOP) expressing the received condition of the propagated radio wave and a correction term expressed by a code on a carrier from the GPS satellite. For example, proper coefficient values K and H corresponding to the values of the GDOP are stored in a lookup table, whereby the coefficient values of the multipliers 27, 28 can be automatically rewritten in response to the change of the GDOP.

Further, the coefficients may be changed in accordance with the navigation situation of the navigation vehicle. For example, when the navigation direction is frequently changed as in an car running on the outskirts, an error tends to occur in the system in which an azimuth angle is calculated on the basis of the time change in the second azimuth computing unit 26b. On the other hand, when the navigation direction is hardly changed as in ships sailing on the ocean, it is expected that the second azimuth computing unit 26b rather generates a stable output. If the values of the coefficients K and H can be changed in accordance with the navigation situation of the navigation vehicle as described above, then the accurate azimuth angle $\phi$ can be outputted.

In this case, the coefficient control unit 21 can be controlled either in an automatic fashion or in a manual fashion.

According to the second embodiment of the present invention, in accordance with the reception condition of the antennas installed on the navigation vehicle, the propagation state of radio wave, the navigation condition of the navigation vehicle or the like, proper coefficient values are applied to the outputs of the first and second azimuth computing units, thereby the accurate azimuth angle suitable for the situations being outputted.

Therefore, the navigation apparatus of the present invention can cope with the fluctuation of the azimuth angle in the conventional GPS azimuth computing unit.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A navigation apparatus utilizing satellite radio waves of a global positioning system comprising:
   (a) at least first and second satellite reception antennas installed on a navigation vehicle at a predetermined distance from each other;
   (b) a first azimuth computing unit for computing a first azimuth angle of said navigation vehicle from the satellite radio waves received at said first and second antennas and the phase difference therebetween;
   (c) a second azimuth computing unit for computing a second azimuth angle from the time change of antenna positions calculated from the satellite radio wave received at said first and second reception antenna;
   (d) first and second multiplying units for multiplying the outputs of said first and second azimuth computing units with predetermined coefficients, respectively;
   (e) an adding unit for adding the outputs of said first and second multiplying units to produce a third azimuth angle, indicative of the motion direction of the navigation vehicle; and
   (f) a coefficient control unit for varying coefficient values of said first and second multiplying units in accordance with either the input from the first and second satellite receptors or the turning frequency of said navigation vehicle.

2. A navigation apparatus utilizing a global positioning system according to claim 1, further comprising an integrator for integrating the third azimuth angle of said adding unit to thereby calculate an output azimuth angle.

3. A navigation apparatus utilizing a global positioning system according to claim 2, further comprising adders respectively coupled to output sides of said first and second azimuth computing units and an output of said integrator is negatively fed back to said adders.

4. A navigator apparatus utilizing a global positioning system according to claim 1, wherein said second azimuth computing unit calculates the second azimuth angle from a velocity vector of said navigation vehicle.

5. A gyro apparatus comprising:
a plurality of satellite reception antennas for installation on a navigation vehicle spaced at predetermined distances therebetween;
computing means for computing an azimuth angle of said navigation vehicle using satellite radio waves received at said antennas and the phase difference therebetween;
an angular velocity sensor secured to said navigation vehicle such that a yaw axis of said navigation vehicle is employed as an input axis of said angular velocity sensor;
an adder supplied with an output of said angular velocity sensor;
integrating means for integrating an output of said adder;
comparing means for comparing the output of said integrating means and the azimuth angle computed by said computing means;
compensating means for scaling the difference detected by said comparing means; and
means for feeding an output of said compensating means to a negative input terminal of said adder.

6. The gyro apparatus as claimed in claim 5, comprising three satellite reception antennas and wherein said computing means also computes a roll angle, a pitch angle and a position of said navigation vehicle using satellite radio waves received at said antennas and the phase difference therebetween.

7. The gyro apparatus as claimed in claim 6, comprising a navigation vehicle inclination correcting means inserted between an output of said angular velocity sensor and said adder for employing computer roll angle and pitch angle outputs to correct the angular velocity.

8. The gyro apparatus as claimed in claim 5, comprising control means provided between said comparing means and said compensating means, said control means being supplied at one input terminal thereof with a constant reference value and at another input terminal thereof with an output of said comparing means so that when the output of said comparing means is larger than said constant reference value, said control means does not produce an output for input to said compensating means.

* * * * *